US007747641B2

(12) United States Patent
Kim et al.

(10) Patent No.: US 7,747,641 B2
(45) Date of Patent: Jun. 29, 2010

(54) MODELING SEQUENCE AND TIME SERIES DATA IN PREDICTIVE ANALYTICS

(75) Inventors: Pyungchul Kim, Sammamish, WA (US); C. James MacLennan, Redmond, WA (US); ZhaoHui Tang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 11/116,832

(22) Filed: Apr. 28, 2005

(65) Prior Publication Data

US 2006/0010142 A1 Jan. 12, 2006

Related U.S. Application Data

(60) Provisional application No. 60/586,844, filed on Jul. 9, 2004.

(51) Int. Cl.
*G06F 7/00* (2006.01)
*G06F 17/30* (2006.01)
(52) U.S. Cl. ...................................... 707/769; 707/776
(58) Field of Classification Search ...................... 707/1, 707/100, 102, 10, 2, 3
See application file for complete search history.

(56) References Cited

U.S. PATENT DOCUMENTS

| 6,601,057 | B1 | 7/2003 | Underwood |
| 6,898,609 | B2 | 5/2005 | Kerwin |
| 7,328,207 | B2 | 2/2008 | Dumitru et al. |
| 2005/0114329 | A1* | 5/2005 | Dettinger et al. ............... 707/5 |
| 2006/0010157 | A1 | 1/2006 | Dumitrascu |
| 2006/0026167 | A1 | 2/2006 | Pasumansky |

OTHER PUBLICATIONS

ZhaoHui Tang, OLE DB for Data Mining—DRAFT Specification. Version 1.0. Microsoft Corporation, Jun. 2000. 129 pages.
XML for Analysis Specification Version 1.0, Microsoft Corporation and Hyperion Solutions Corporation, Last Updated Apr. 24, 2001, 107 Pages, http://www.xmla.org/download.asp?id=2.
Decision Support Objects, Microsoft Corporation, Last viewed on Jun. 27, 2005, 1 page, http://msdn.microsoft.com/library/default.asp?url=/library/en-us/olapdmpr/prabout_84a4.asp.
DIME Specification Index Page, Microsoft Corporation, Last Viewed on Jun. 27, 2005, 1 Page, http://msdn.microsoft.com/library/default.asp?url=library/en-us/dnglobspec/html/dimeindex.asp.
H.F. Nielsen et al., Direct Internet Message Encapsulation, Internet Engineering Task Force, Jun. 17, 2002, 24 Pages, http://msdn.microsoft.com/library/en-us/dnglobspec/html/draft-nielsen-dime-02.txt.

(Continued)

*Primary Examiner*—Charles Rones
*Assistant Examiner*—Fariborz Khoshnoodi
(74) *Attorney, Agent, or Firm*—Merchant & Gould P.C.

(57) ABSTRACT

The subject invention relates to systems and methods to extend the capabilities of declarative data modeling languages. In one aspect, a declarative data modeling language system is provided. The system includes a data modeling language component that generates one or more data mining models to extract predictive information from local or remote databases. A language extension component facilitates modeling capability in the data modeling language by providing a data sequence model or a time series model within the data modeling language to support various data mining applications.

20 Claims, 9 Drawing Sheets

OTHER PUBLICATIONS

J. Kangasharju, S. Tarkoma, and K. Raatikainen, Comparing SOAP Performance for Various Encodings, Protocols, and Connections, In Personal Wireless Communications, Lecture Notes in Computer Science 2775, Springer-Verlag, Sep. 2003.

Ken Henderson, Section "Transaction Commands and Syntax" in Chapter 17 of "The Guru's Guide to Transact-SQL", Addison Wesley, 2000.

Tomas Restrepo, "Authentication the SSPI way", 2001.

Office Action dated Jul. 24, 2008 cited in U.S. Appl. No. 11/069,342 (Copy Attached).

Office Action dated Dec. 7, 2007 cited in U.S. Appl. No. 11/069,480 (Copy Attached).

Office Action dated Jun. 24, 2008 cited in U.S. Appl. No. 11/069,480 (Copy Attached).

Office Action dated Sep. 29, 2009 cited in U.S. Appl. No. 11/069,480 (Copy Attached).

Non Final Office Action issued in U.S. Appl. No. 11/069,480 dated Mar. 18, 2010, 14 pages.

* cited by examiner

MODELING SEQUENCE AND TIME SERIES DATA IN PREDICTIVE ANALYTICS

RELATED APPLICATIONS

This application claims priority to U.S. Provisional Patent Application Ser. No. 60/586,844 filed on, Jul. 9, 2004 and entitled SYSTEMS AND METHODS TO FACILITATE UTILIZATION OF DATABASE MODELING, the entire contents of which are herein incorporated by reference.

TECHNICAL FIELD

The subject invention relates generally to computer systems, and more particularly, relates to systems and methods that extend the predictive capabilities of data mining languages and models.

BACKGROUND OF THE INVENTION

Data mining relates to the process of exploring large quantities of data in order to discover meaningful information about the data that is generally in the form of patterns and rules. In this process, various forms of analysis can be employed to discern such patterns and rules in historical data for a given application or business scenario, and the information can then be stored as an abstract mathematical model of the historical data, referred to as a data mining model. After the data mining model is created, new data can be examined through the model to determine if the data fits a desired pattern or rule. From this information, actions can be taken to improve results in many applications.

Various applications can benefit by employing data mining techniques. For instance, many organizations can be considered "data rich," since they are collecting increasing volumes of data for business processes and resources. Typically, these volumes or data mountains are used to provide "facts and figures" such as "there are X categories of occupation," or "this year's mortgage accounts in arrears" and so forth. However, merely having information at one's disposal does not necessarily represent knowledge but rather data to be further analyzed. Thus, it is patterns in the data that is more closely linked to knowledge than the actual data itself.

In many cases, data mining enables complex business processes to be understood and re-engineered. This can be achieved through the discovery of patterns in data relating to the past behavior of a business process. Such patterns can be utilized to improve the performance of a process by exploiting favorable patterns and avoiding problematic patterns. Examples of business processes where data mining can be useful are customer response to mailing, lapsed insurance policies and energy consumption. In each of these examples, data mining can reveal what factors affect the outcome of the business event or process and the patterns relating the outcome to these factors. Such patterns increase understanding of these processes and therefore the ability to predict and affect the outcome.

In recent times, there has been some confusion among potential users of data mining as to which data mining technologies may apply. This confusion has been compounded by some technologies that claim to provide data mining tools when in reality the support is merely given to users to manually mine data for themselves. For instance, some vendors of query and reporting tools and OLAP (On-Line Analytical processing) tools promote that their products can be employed for data mining. While it is true that one can discover useful patterns in data using these tools, there is a question mark as to who or what is performing the discovery—the user or the tool. For example, query and reporting tools can interrogate data and report on any pattern (query) requested by the user. This is a manual and validation driven process of discovery in the sense that unless the user suspects a pattern they may never be able to determine it. A marginally better situation is encountered with the OLAP tools, which can be termed "visualization driven" since they assist the user in the process of pattern discovery by displaying multi-dimensional data graphically. The class of tools that can genuinely be termed "data mining tools" however, are those that support the automatic discovery of patterns in data.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that provide data modeling language extensions to a declarative data modeling language. In one aspect, data sequence models and instructions are provided to support modeling of sequence data in predictive analytics. Sequence support for the data modeling language allows for generating various data mining models for applications associated with predictive analysis. One purpose of a sequence is to predict or determine common sequences or sequential data sets, and also predict consequent sequence states. For example, predicting DNA analysis, weather patterns, web clicks, shopping behaviors are all sequence oriented tasks. Thus, the language extensions provide sequence models in a relational database format (e.g., Structured Query Language) as part of a data mining language. This includes content type 'Key Sequence', prediction functions for sequence, and sequence model structures, for example.

In another aspect of the subject invention, time series capabilities and models are provided as language extensions to the declarative data modeling language. As with sequence language extensions, time series support for the data modeling language also enables generation of data mining models for predictive analysis applications. In this aspect, time series can be employed to predict the next n data values based on a series of numbers, n being an integer value. For example, product sales, stock tickers, interest rates are related to time series. Similar to the sequence language extensions, model time series can be incorporated within a relational framework and include the content type 'Key Time', prediction functions for time series, and time series model structures, for example. The sequence and time series extensions enable various data mining tasks and can be employed in a plurality of data prediction applications.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods to extend the capabilities of declarative data modeling languages. In one aspect, a declarative data modeling language system is provided. The system includes a data modeling language component that generates one or more data mining models to extract predictive information from local or remote databases. A language extension component facilitates modeling capability in the data modeling language by providing a data sequence model or a time series model within the data modeling language to support various data mining applications. Various prediction capabilities, schemas, and parameters are also provided with the models to support data mining and predictive analytics.

As used in this application, the terms "component," "system," "object," "language," "extension," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
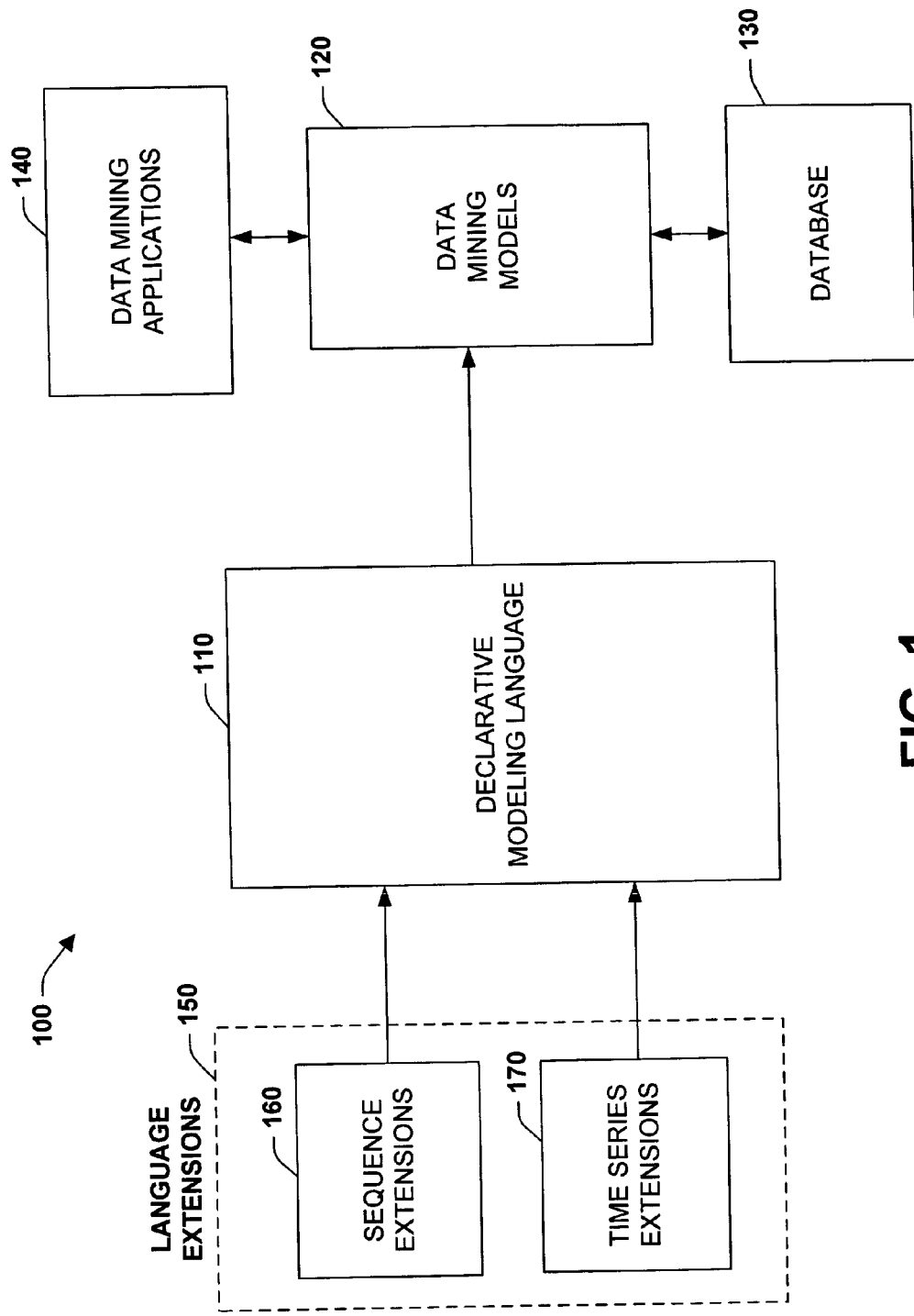
FIG. 1 is a schematic block diagram illustrating a data modeling system in accordance with an aspect of the subject invention.

Referring initially to FIG. 1, a declarative language modeling system 100 is illustrated in accordance with an aspect of the subject invention. The system 100 includes a declarative modeling language component 110 that enables developers to automatically create and deploy one or more data mining models 120. After generating the models 120, one or more local or remote databases 130 can be automatically mined or harvested for information from a plurality of data mining applications 140. In general, the declarative language component 110, the mining models 120, and the database 130 can be adapted to a relational database structure such as a Structured Query Language model, for example, although it is to be appreciated that substantially any type of declarative modeling language 110 or database 130 format can be employed. To facilitate data mining in accordance with the subject invention, various language extensions 150 can be provided for the declarative modeling language component 110 to create the data mining models 120.

In one aspect, the language extensions 150 include sequence extensions 160 that can be employed by the declarative language component 110 to create and execute the data mining models 120. This can include a sequence clustering algorithm which is described in more detail below that combines data mining techniques such as sequence analysis and clustering, for example. Sequence analysis relates to analyzing sequence related patterns. For example, a series of web clicks at a web site supported by the database 130 forms a sequence. Clustering relates to grouping a heterogeneous dataset into more or less homogeneous subsets, whereas the sequence clustering algorithm facilitates the clustering of similar sequences. For example, a web site can employ this technique to cluster common navigation patterns for users. The following code fragment describes an example sequence model provided by the sequence extension component 160 as follows:

```
Create mining model WebSequence (
    SessionId text key,
    Sequences table (
        SequenceID long key Sequence,
        Page text,
    )
)
Using Sequence_Algorithm
```

In the above example model, a sequence series is modeled as a nested table. The nest key is a Sequence ID, with Key Sequence as content type. The column Page represents the state of the sequence. The last portion of the example relates to the algorithm used to model the sequence which is described in more detail below.

In another aspect of the subject invention, the language extensions 150 include time series extensions 160 that can be employed by the declarative language component 110 to create and execute the data mining models 120. Time series is considered a valued data mining application 140 by users and can be employed to perform predictions on continuous variables, for instance, that may reside in the database 130. For example, applications 140 can utilize time series to predict web "hits" or visits to a commerce site in the coming months. Also support personnel may utilize time series to predict data from Online Analytical Processing (OLAP) sources, if desired. For example, to predict sales and profits of some corporation based on historical data in an OLAP cube residing in the database 130. Similar to above, the following fragment depicts an example time series model as follows:

```
CREATE MINING MODEL SalesForecastTimeSeries
{
    Date     DATE KEY TIME,
    Product  TEXT KEY,
    Sales    DOUBLE CONTINUOUS PREDICT,
} USING Time_Series algorithm
```

In this model, Date is with content type Key_Time, which is provided for time keys. Product is also a Key as well, and represents a series name (e.g., book products, office products, and so forth). Sales is a continuous predictable attribute, and contains the actual values of the series. The last portion of the example relates to the algorithm employed to model the time series. Time series can have many different formats, where one popular format is depicted in the following example:

```
CREATE MINING MODEL StockForecastTimeSeries
{
    Date     DATE KEY TIME,
    COMPANY  DOUBLE CONTINUOUS PREDICT,
    INTL     DOUBLE CONTINUOUS PREDICT,
} USING Time_Series algorithm
```

In this model, there is typically no other key column in lieu of Key Time. Company, INTL, and so forth are numeric columns that can include continuous numbers or values as series. The Date is the Key time column. FIGS. 2-7 will now be described and illustrate example aspects of the concepts described above with respect to FIG. 1.

Figure 2:
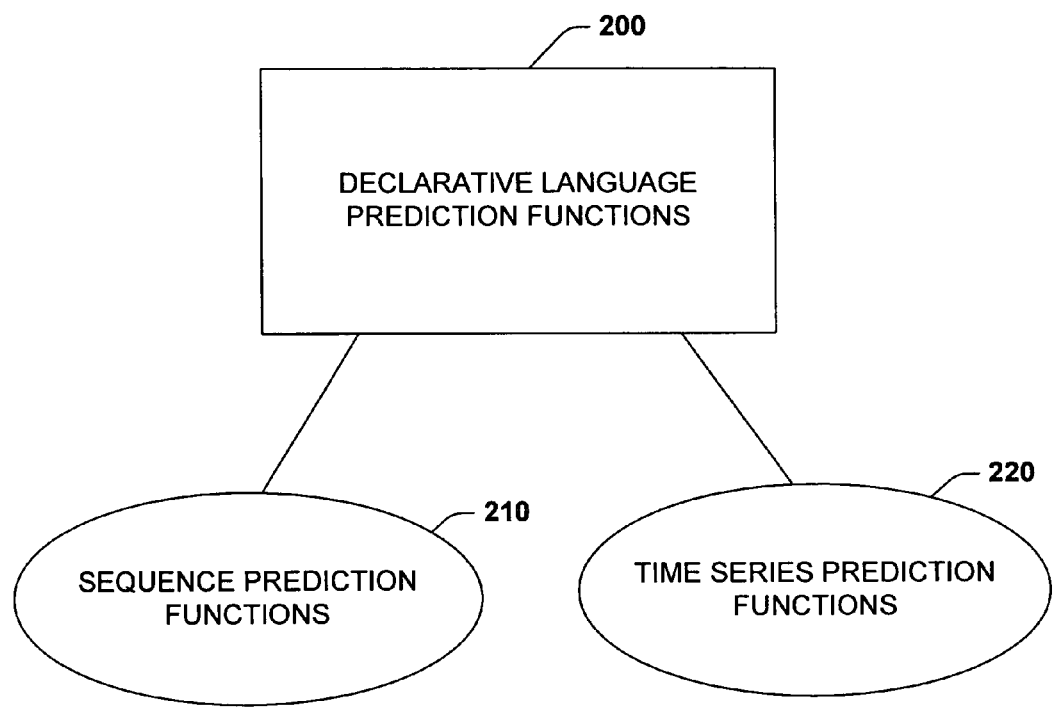
FIG. 2 is a diagram illustrating declarative language prediction functions in accordance with an aspect of the subject invention.

Referring now to FIG. 2, example declarative language prediction functions 200 are illustrated in accordance with an aspect of the subject invention. In this aspect, a prediction function for sequences is provided at 210 and a prediction function for time series is illustrated at 220. With respect to the sequence prediction function 210, the following example syntax is provided:
PredictSequence
Syntax:
PredictSequence(<table column reference>)
PredictSequence(<table column reference>, n)
PredictSequence(<table column reference>, n-start, n-end)
Return type:
<Table expression>

As noted, the function 210 is provided for predictions on sequence data. Sequence data is typically discrete and can be stored in a nested table. The function 210 generally returns future sequence values. When parameter n is specified, it returns the most likely sequence values in the next n step, n>0. If n<5, it returns the predicted value in the past. If both n-start and n-end is specified, it returns the sequence values from n-start to n-end. Another aspect can include a $Sequence value to represent an identifier (id) of a sequence step.

Regarding the time series prediction function 220, the following example syntax is provided:
PredictTimeSeries
Syntax:
PredictTimeSeries(<table column reference>)
PredictTimeSeries(<table column reference, n>)
PredictTimeSeries(<scalar column reference, n-start, n-end>)
PredictTimeSeries(<scalar column reference>)
PredictTimeSeries(<scalar column reference, n>)
PredictTimeSeries(<scalar column reference, n-start, n-end)
Return type:
<Table expression>

This function 220 is provided for predictions on time series data. Time series data can be continuous and can be stored in a nested table or in case table, if desired. The function 220 typically returns future values for time series. When parameter n is specified, the function 220 generally returns the most likely time series values in the next n time slices. A value $Time can be employed to represent an identifier (id) for time slice data, if desired.

Figure 3:
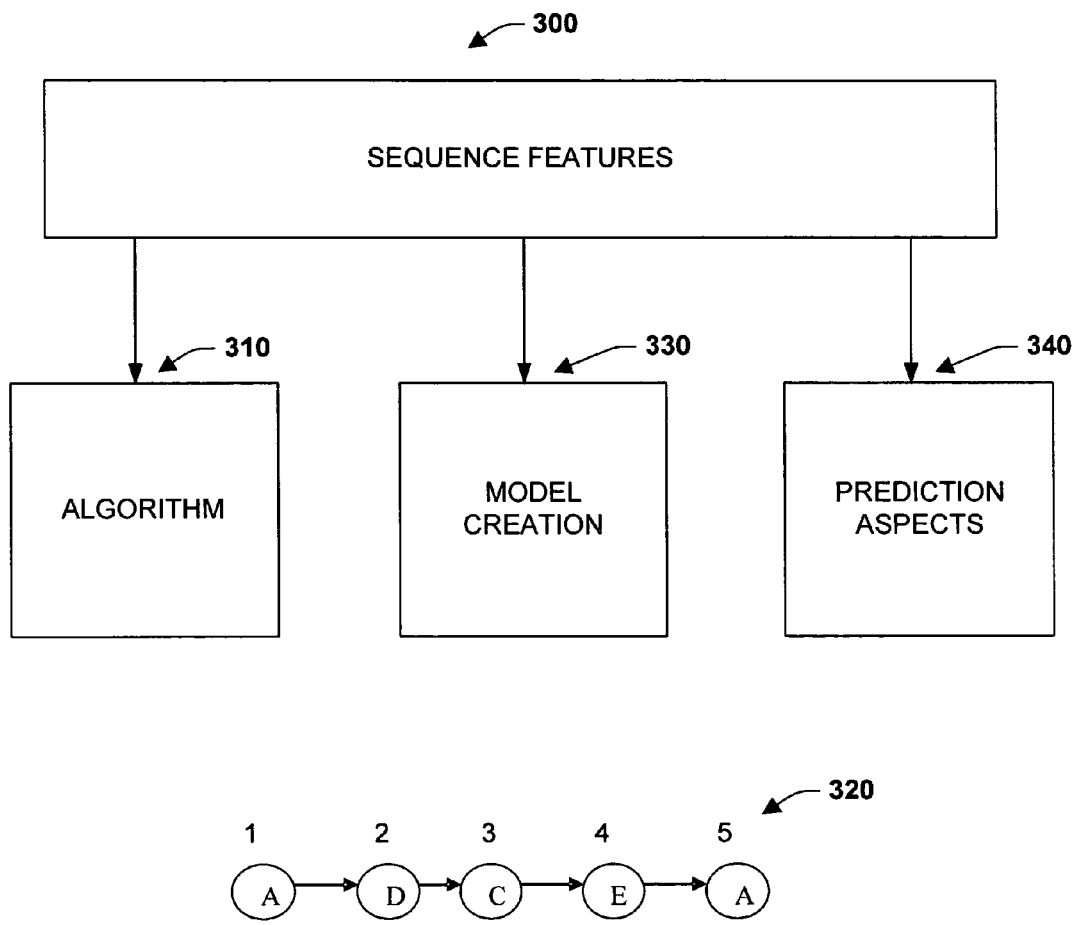
FIG. 3 illustrates exemplary sequence model features in accordance with an aspect of the subject invention.

Turning to FIG. 3, exemplary sequence model features 300 are illustrated in accordance with an aspect of the subject invention. At 310 one or more algorithms can be provided for respective sequence models. For instance, a Sequence Clustering algorithm 310 can be based on an assumption that different states in a sequence and the transition among these states can be modeled in a Markov chain. Also, another design assumption can be that different cases lie in different clusters, each cluster having a different Markov model. An example sequence of five steps is illustrated at 320 although it is to be appreciated that various sequences having different amounts of steps and orderings can be provided. In general, it can be assumed that the cases are generated by a mixture of first-order Markov models, wherein each mixture component of the model corresponds to a cluster. In one specific example, a Sequence Clustering algorithm selects a model with K clusters that minimizes:

$$\text{score}(K, Dtest) = -\frac{\sum_{j=1}^{N} \text{Log}_2 P(X = x^j \mid \theta^k)}{\sum_{i=1}^{N} \text{length}(x^i)}$$

where the $x^j$ are examples from a test set, $\theta^k$ are the parameters obtained from the algorithm, and length($x^i$) is a length of the sequence for case i.

Proceeding to 330 of FIG. 3, model creation aspects are considered. The following query examples illustrate some possible options on how to create a mining model using a Sequence Clustering algorithm described above. Generally, the mining model is created with a nested table although other implementations are possible. A case table includes a list of session ids, and the nested table includes the session id, a sequence ID and a page (URL) and duration, for example. It is also possible to add more attributes in the case table and in the nested table. The key of the nested table is the Sequence ID with content type Sequence of. The non-sequence oriented attributes (Duration, PageRating) are considered as properties of a sequence oriented attribute (Page). One implementation includes one sequence per model although multiple sequences per model can also be provided.

At 340 of FIG. 3, prediction aspects for sequences are considered. When the prediction function returns a number of consequence steps, the probability of $P_n$ is smaller than $P_{n-1}$, where n is the step number. The formula to calculate of Pn is the following example: Pn=Pn-1*P(Sn|Sn-1), where P(Sn|Sn-1) is the probability from state Sn-1 to Sn in the closest cluster for the case. The following examples are the result of some sample prediction queries:
Select SessionID, (Select $Sequence, Page, PredictProbability(Page) as Proba from PredictSequence(Sequences, 3))

From . . . results in the following example tables:

| Session | Sequences | | |
|---|---|---|---|
| ID | $Sequence | Page | Proba |
| 001 | 1 | A.htm | 0.54 |
| | 2 | F.htm | 0.36 |
| | 3 | B.htm | 0.21 |

Select SessionID, (Select $Sequence, PredictHistogram (Page) As PH from PredictSequence(Sequences, 2))

From . . . results in the following example table:

| Session | Sequences | | | |
|---|---|---|---|---|
| | | PH | | |
| ID | $Sequence | Page | $Support | $Probability |
| 001 | 1 | A.htm | 80 | 0.80 |
| | | B.htm | 15 | 0.15 |
| | | C.htm | 10 | 0.10 |
| | 2 | B.htm | 55 | 0.55 |
| | | A.htm | 35 | 0.35 |
| | | C.htm | 10 | 0.10 |

Figure 4:
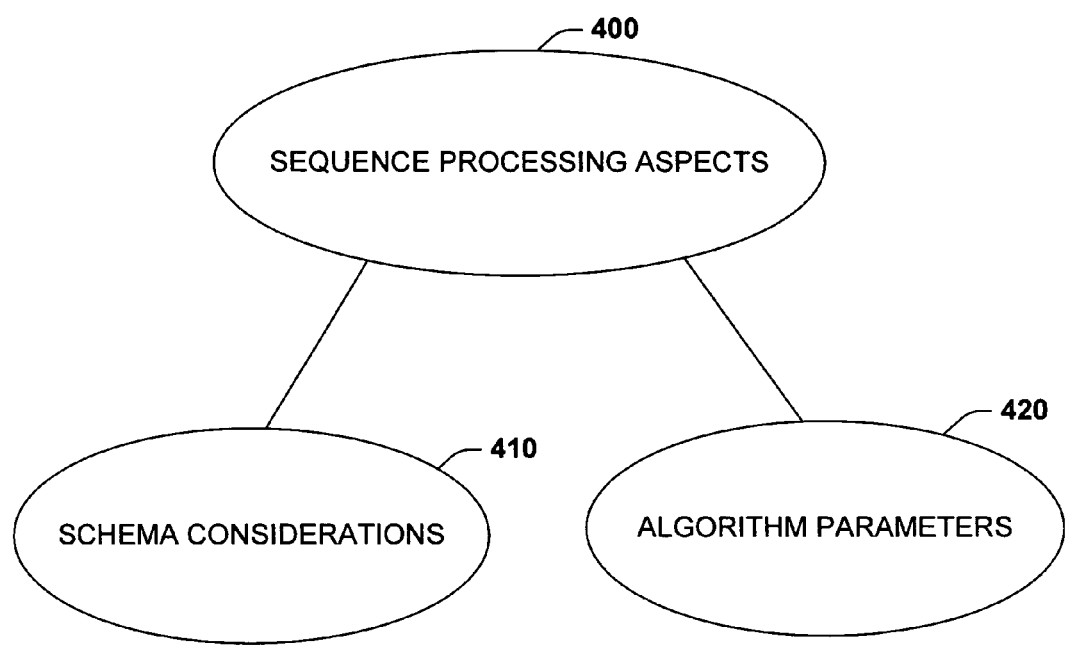
FIG. 4 illustrates sequence model processing aspects in accordance with an aspect of the subject invention.

FIG. 4 illustrates sequence model processing aspects 400 in accordance with an aspect of the subject invention. As noted above, the data mining language extensions can be adapted to a relational database structure. As such, various schema considerations may apply at 410. For instance, a Schema Rowsets stores can be provided that includes the contents of a mining model. This can include a transition matrix for Sequence Clustering that stores the probability of transitions from different states. To support the transition matrix, state transit information can be stored. Thus, schema rowsets can include: All, Cluster and Sequence, for example. The All node is the root, which represents a model, wherein Cluster is the children of All. The All rowset also can have a special child named Sequence, which stores a marginal transition matrix. Each cluster generally has a child called Sequence, which contains a set of children, each of which can be a column in the transition matrix. Thus, the content of the schema 410 can include four levels: All, Cluster, Sequence root (Matrix root) and Columns of the matrix.

At 420, one or more algorithm parameters can be provided for sequence extensions. These can include the Number of clusters (CLUSTER_COUNT). This parameter describes the maximum number of clusters to be formed. Another parameter 420 relates to the Minimum Cluster Cases (MINIMUM_CLUSTER_CASES). This parameter specifies the minimum size of each cluster. A Maximum Sequence States (MAXIMUM_SEQUENCE_STATES) parameter is an integer type, wherein the default is 64, however, the user can overwrite this value. A Maximum States (MAXIMUM_ STATES) parameter specifies the maximum states for a clustering algorithm attribute. A Cluster Seed (CLUSTER_ SEED) parameter is an integer type and allows setting of a seed for the cluster. As can be appreciated, other parameters 420 can be provided.

Figure 5:
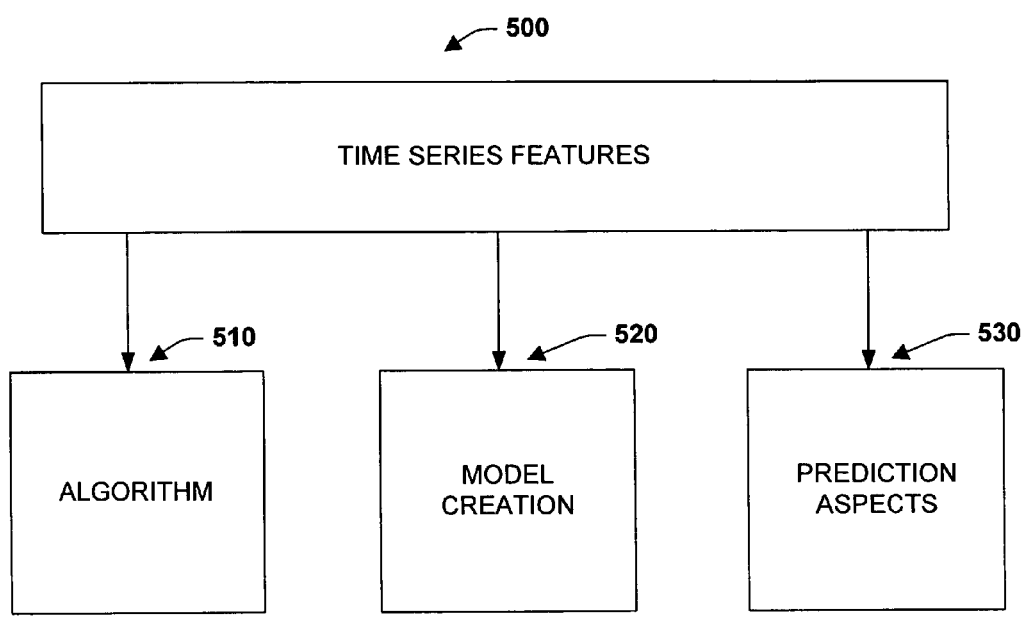
FIG. 5 illustrates exemplary time series model features in accordance with an aspect of the subject invention.

FIG. 5 illustrates exemplary time series model features 500 in accordance with an aspect of the subject invention. At 510, substantially any type of prediction algorithm can be employed that considers time sequence data. For instance, a regression tree or other type algorithm can be employed. At 520, time series model creation aspects are considered. For example, the following is a time series model predicts Store Sales and Unit Sales for each Store.

```
Create mining model SalesPredictionTS4 (
    TimeID text key time,
    Ticker text key discrete,
    Price long continuous predict
    Volume long continuous predict
)
Using TimeSeries_Algorithm
```

The data structure of the input data to this model is the following example:

| TimeID | Ticker | Price | Volume |
|---|---|---|---|
| 1/2001 | MSFT | 60 | 1000 |
| 2/2001 | MSFT | 62 | 1200 |
| 1/2001 | IBM | 115 | 900 |
| 2/2001 | IBM | 116 | 930 |

Sometimes, input data is not in the above format. Thus, the store name may already be pivoted to be columns, i.e., each Store Name becomes a column as the following:

| TimeID | MSFTPrice | MSFTVolume | IBMPrice | IBMVolume |
|---|---|---|---|---|
| 1/2001 | 100 | 80 | 1000 | 900 |
| 2/2001 | 120 | 90 | 1320 | 930 |

In this case, the user can build the model as following:

```
Create mining model SalesPredictionTS3 (
    TimeID text key time,
    MSFTPrice long continuous predict
    MSFTVolume long continuous predict
    IBMPrice long continuous predict
    IBMVolume long continuous predict
)
Using TimeSeries_Algorithm
```

At 530 of FIG. 5, time series prediction aspects are considered. In this aspect, predictions are based on training data to estimate a possible trend. A length of time sequence data can be included in a prediction function. For example, the following prediction function predicts the sales value in the coming four time units. A new prediction function is added for sequence series type algorithm prediction such as:

PredictTimeSeries(column, n), e.g., PredictTimeSeries (SalesAmount, 4).

Example Query: Select t.product, t.region, t.StoreSize, PredictTimeSeries(SalesAmount, 4) from sales . . .

The above example query returns:

| | | | SalesAmount | |
|---|---|---|---|---|
| Product | Region | StoreSize | $Time | SalesAmount |
| Coke | US | 100 | 1 | 100 |
| | West | | 2 | 120 |
| | | | 3 | 140 |
| | | | 4 | 200 |

Figure 6:
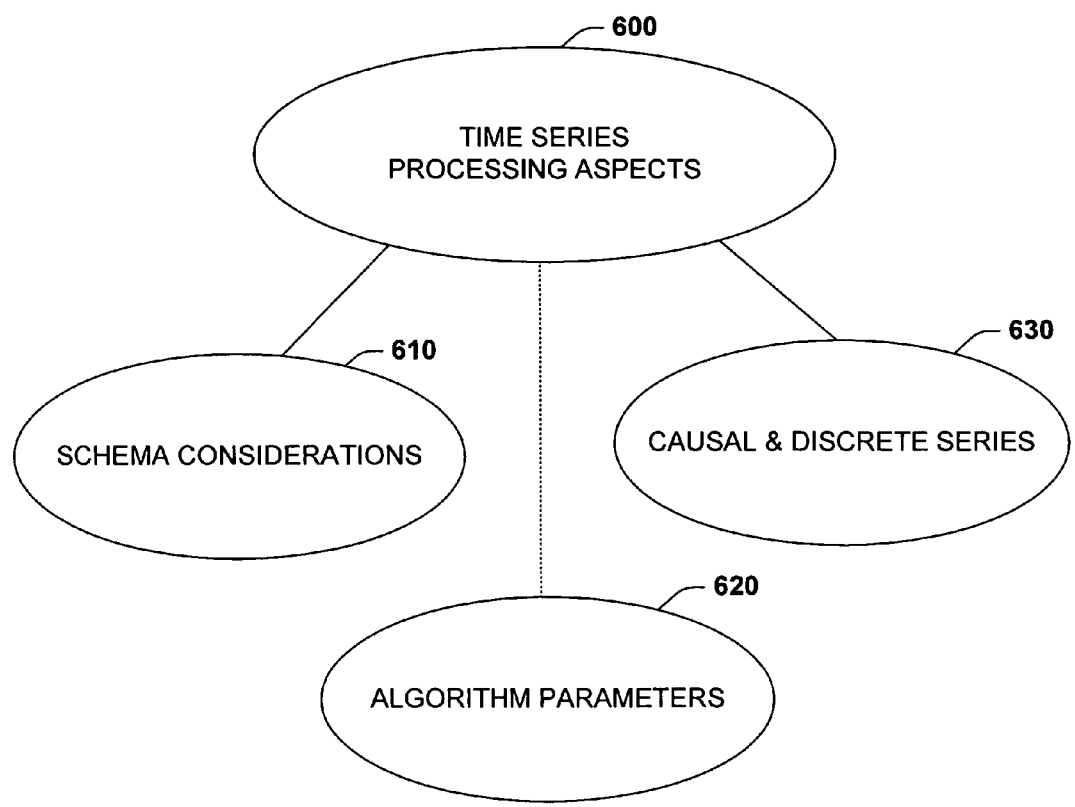
FIG. 6 illustrates time series model processing aspects accordance with an aspect of the subject invention.

FIG. 6 illustrates time series model processing aspects 600 in accordance with an aspect of the subject invention. Similar to the sequence modeling aspects as described above, time series modeling 600 can include schema considerations 610 and algorithm parameters 620. Certain types of time series data such as causal data and discrete data is also considered at 630. With respect to the schema considerations 610, a content Schema Rowset stores the contents of a mining model. The content schema rowsets of a Time Series Algorithm can have similar structure as decision trees, for example. Regression coefficients can be stored in a distribution schema rowsets using two columns for example: ATTRIBUTE_NAME and ATTRIBUTE_VALUE.

To store yintercept values, the ATTRIBUTE_NAME is yintercept, the ATTRIBUTE_VALUE is its value with VALUETYPE=continuous. A regressor can have three items to store for example: Attribute Name, TimeOffset and Coefficient. The following example format can be provided to store data in a Distribution rowset as follows:

ATTRIBUTE_NAME: AttributeName[time offset]
ATTRIBUTE_VALUE: coefficient
VALUETYPE: Regressor.

In a Content Schema Rowset the following example format can apply:

NodeCaption: store the current split condition
NodeDescription: Store the complete path of splitting conditions
NodeRule: XML representation of the complete path+regression formula.

Various algorithm parameters 620 can be provided. These can include MINIMUM_LEAF_CASES parameter, a COMPLEXITY_PENALTY parameter, and a PERIODICITY_HINT parameter, if desired. This latter parameter provides a hint to the algorithm about periodicities in the data. One example format is: {n [, n]} where the portion in [ ] is optional and can be repeated, and n is any positive number (floating point is also satisfactory, and decimal delimiter is ".". Another parameter 620 includes HISTORICAL_MODEL_COUNT which can be employed to define the number of future steps to be cached for prediction purposes during training. A HISTORICAL_MODEL_GAP parameter is associated with HISTORICAL_MODEL_COUNT, and specifies the gap between historical models. For example, a HISTORICAL_PREDICTION_COUNT=3 and HISTORICAL_MODEL_GAP=10. This indicates 3 historical models are constructed, the time gap of each model is 10 time units. A MISSING_SLICE_HANDLING parameter specifies how a missing time slice is processed. For example, a few choices include: 0, Min, Max, Mean, and Previous. An AUTO_DETECT_PERIODICITY parameter can be a float type with values ranging from [0.0, 1.0]. The higher the value, the higher the probability to find patterns. One algorithm that can be employed for this is a Fast Fourier Transform (FFT), for example.

At 630, time series data processing aspects can take different forms. In one aspect, causal data can be considered wherein causal predictors can be employed in time series models. This implies that time series data can be enhanced with (generally) discrete data that can be used to predict the series. Additionally, this data can be contemporary with the time slice that is to be predicted. For example, "It's raining, how many umbrellas are going to be sold today?" In another aspect, discrete time series data is processed. Thus, as previously described, time series models may include discrete attributes, wherein the discrete attributes are predictable. In this case, a time series algorithm as previously described can be utilized to analyze the sequences.

Figure 7:
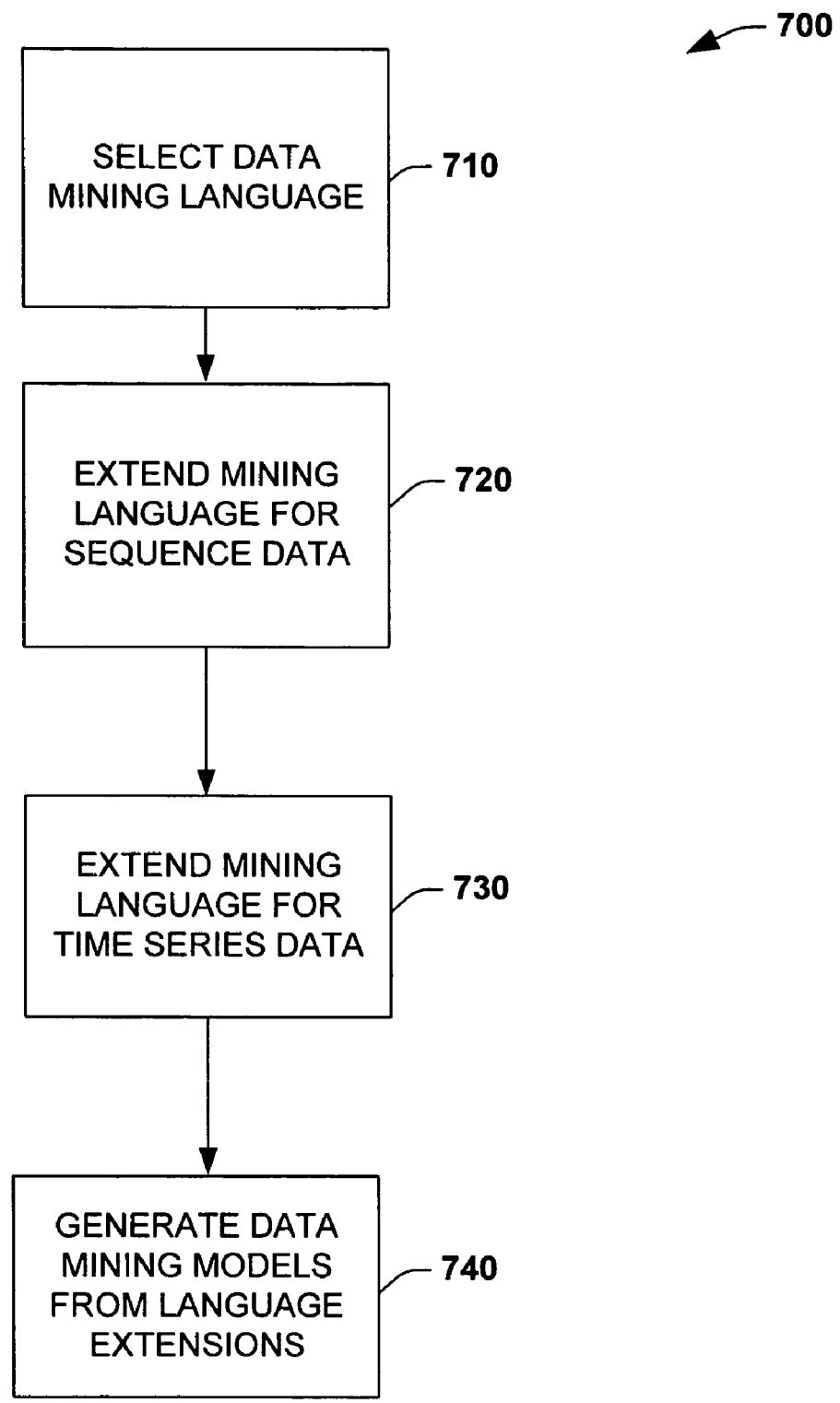
FIG. 7 illustrates an exemplary data modeling process in accordance with an aspect of the subject invention.

FIG. 7 illustrate an example data modeling process 700 in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 7 illustrates a data modeling process 700 in accordance with an aspect of the subject invention. Proceeding to 710, a data mining language is selected. In general, the language can be associated with substantially any data set but typically a relational database is mined in accordance with the selected language. At 720, the data mining language is extended to process sequence data. As noted above, Sequence data is of the type that is typically employed to predict common sequences and related sequence states. At 730, the dining mining language is extended to process time series data. As with sequence extensions. This can include providing parameters, schemas, and algorithms to process such data and/or instructions relating to the extensions. Also, as noted above, time series data is employed to predict the next possible or probable n values or data given time series information in a database. At 740, one or more data mining models are automatically generated via the data mining language and the respective sequence and time series extensions. Upon generation of the models, various applications can exploit the models to determine predictive information form a database or databases. Such applications can relate to business applications, medical applications, research application, mathematical applications, environmental applications, and so forth.

Figure 8:
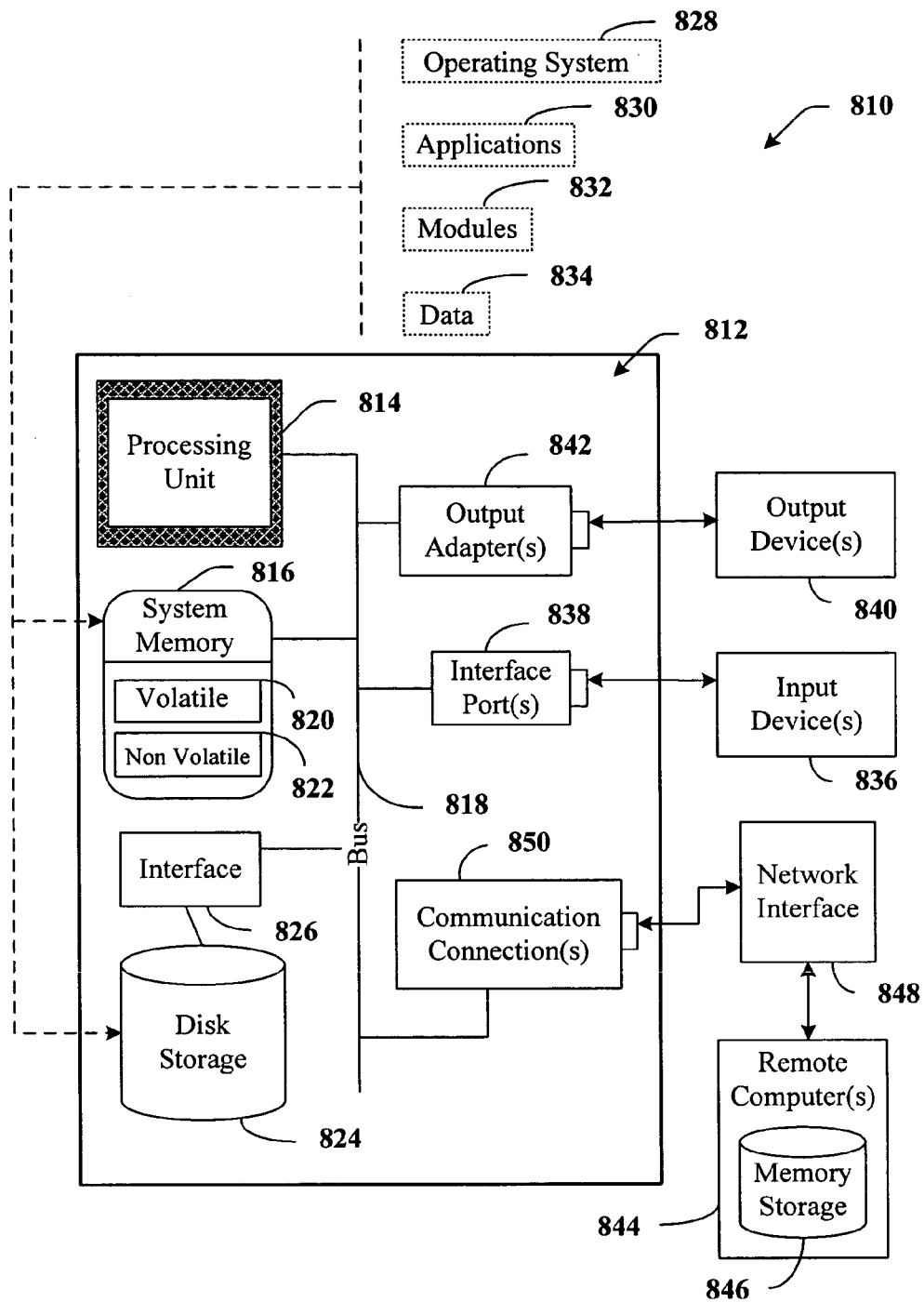
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
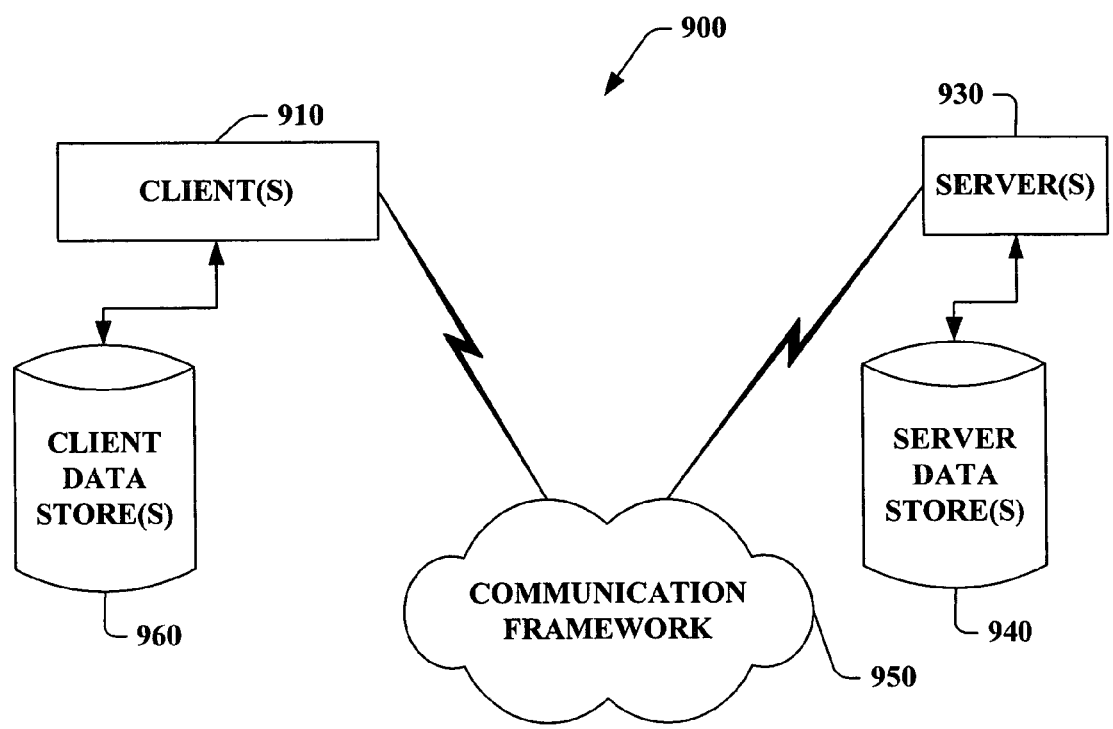
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A declarative data modeling language system for predicting sequences and time series data automatically, and by identifying patterns without manual pattern identification or validation, comprising:
 a processor and memory;
 a data modeling language component that automatically generates at least one data mining model to extract predictive information from at least one database, and in a manner that does not require manual identification or validation of a predictive pattern;
 a plurality of language extension components configured in the data modeling language, the plurality of language extension components providing at least:
 a data sequence model in the data modeling language to generate sequence predictions;
 a time series model in the data modeling language and facilitating generating time series predictions of at least one of a casual or discrete subsequent data value in a time series, wherein the sequence model and the time series model are separate models, and in which the data sequence model predicts events based at least in part on historical event data, and the time series model predicts numerical time values based on historical numerical time value data;
 wherein one or both of the data sequence model or the time series model include schema rowsets stores that include contents of a mining model according to a transition matrix for clustering sequences and storing probabilities of transitions between different states;
 wherein the schema rowsets include All, Cluster and Sequence, in which:
  All is a node that is a root and represents a model;
  Cluster is a child of All; and
  Sequence is a child of All that stores a marginal transition matrix, and in which each Cluster has a Sequence child that contains a set of children, each of which is a column in the transition matrix; and
 wherein the memory configured to the processor retains at least one piece of information that pertains to the data modeling language component or the language extension components when directed to the processor.

2. The system of claim 1, wherein the data modeling language is associated with a relational database language.

3. The system of claim 2, wherein the relational database language is a structured query language.

4. The system of claim 1, wherein the data mining models are employed with at least one automated application that queries a database for sequence model predictions or time series model predictions.

5. The system of claim 1, wherein the data sequence model is associated with a data sequence that includes at least one of a DNA sequence, a web sequence, a weather sequence, or a buying sequence.

6. The system of claim 5, wherein the data sequence model is associated with a sequence clustering algorithm.

7. The system of claim 6, wherein the sequence clustering algorithm is employed to cluster user navigation patterns with respect to a web site.

8. The system of claim 1, wherein the time series model is associated with continuous variables.

9. The system of claim 1, wherein the time series model is associated with an Online Analytical Processing (OLAP) cube or a relational data structure.

10. The system of claim 1, wherein the time series model is associated with a data component that is associated with a time parameter.

11. The system of claim 1, wherein the data sequence model is associated with a predict sequence function.

12. The system of claim 1, wherein the time series model is associated with a predict time series function.

13. The system of claim 1, wherein the data sequence model or the time series model are associated with a nested table or a flat t table.

14. The system of claim 13, wherein the nested table is associated with a probability.

15. The system of claim 14, wherein the nested table is associated with a state transition schema.

16. A computer implemented method for generating data mining models and predicting sequences and time series data automatically, and by identifying patterns without manual pattern identification or validation, comprising:
 at a computing system, executing computer-executable instructions using one or more processors, wherein execution of the computer-executable instructions directs the computing system to:
 provide a plurality of language extensions to a database modeling language, the plurality of language extensions including:
 at least one data sequence model in the database modeling language to generate sequence predictions;
 at least one time series model in the database modeling language to generate time series predictions, wherein the at least one data sequence model and the at least one time series model are separate models, and in which the data sequence model predicts events based at least in part on historical event data, and the time series model predicts numerical values based on historical numerical value data;
 wherein the schema rowsets include All, Cluster and Sequence, in which:
  All is a node that is a root and represents a model;
  Cluster is a child of All; and
  Sequence is a child of All that stores a marginal transition matrix, and in which each Cluster has a Sequence child that contains a set of children, each of which is a column in the transition matrix; and
 automatically, with a computing system and without manual pattern identification or validation, generate data mining models from the plurality of language extensions;
 generate a query for a database; and
 automatically generate at least one sequence prediction and at least one time series prediction from the database based on the query and the data mining models, wherein the sequence prediction predicts a future event and the time series prediction predicts a future numerical time value and is based on at least one of casual data or discrete data.

17. The method of claim 16, further comprising generating a session identifier key, a sequence identifier or a sequence table in response to the query.

18. The method of claim 16, further comprising generating a probability prediction based at least in part on continuous data, a flat rowset, or a nested rowset.

19. A system to facilitate data mining operations and predict sequences at time series data automatically, and by identifying patterns without manual pattern identification or verification, comprising:
 one or more computer-readable media having stored thereon computer executable instructions that, when executed by a processor, cause the system to:
 A processor and memory;
 query a relational database;

generate a data mining model to determine predictive information from the database;
modify the data mining model to each of a casual data time series, discrete data time series, and a data sequence;
generate probabilities from the database in view of the data time series or the data sequence, such that:
probabilities associated with the casual data time series and the discrete data time series predict future numerical time values based on historical numerical time values; and
wherein the schema rowsets include All, Cluster and Sequence, in which:
All is a node that is a root and represents a model;
Cluster is a child of All; and
Sequence is a child of All that stores a marginal transition matrix, and in which each Cluster has a Sequence child that contains a set of children, each of which is a column in the transition matrix; and
probabilities associated with the data sequence predict future events based on historical event data; and
wherein the memory configured to the processor to the one or more computer-readable media and which, upon request, executes at least one command in relation to the aforementioned querying or generating.

20. The system of claim 19, wherein:
the data mining model is adaptable to a relational database structure and includes schema rowsets stores that include contents of a mining model according to a transition matrix for clustering sequences and storing probabilities of transitions between different states, and in which generating the probabilities includes evaluating schema considerations and algorithm parameters;
algorithm parameters usable with the data mining model for data sequence prediction include:
a parameter for a maximum number of clusters to be formed;
a parameter for a minimum size of each cluster;
a parameter for a maximum number of states for a clustering algorithm attribute; and
an integer-type parameter allowing setting of a seed for a cluster; and
algorithm parameters with the data mining model for time sequence prediction include:
a parameter that provides hints about periodicities in mined data;
a parameter that defines a number of future steps cached for prediction purposes during training;
a parameter specifying a gap between historical models;
a parameter specifying how to handle a missing time slice; and
a floating parameter in which a higher value indicates a higher likelihood of finding patterns.

* * * * *